United States Patent
Wahlstrom (10) Patent No.: US 8,258,932 B2
(45) Date of Patent: Sep. 4, 2012

(54) OCCUPANT DETECTION SYSTEM FOR VEHICLE

(75) Inventor: Jonas Erik Ragnar Wahlstrom, Landveter (SE)

(73) Assignee: Donnelly Corporation, Holland, MI (US)

( * ) Notice: Subject to any disclaimer, the term of this patent is extended or adjusted under 35 U.S.C. 154(b) by 836 days.

(21) Appl. No.: 11/719,476

(22) PCT Filed: Nov. 22, 2005

(86) PCT No.: PCT/US2005/042504
§ 371 (c)(1),
(2), (4) Date: Aug. 17, 2009

(87) PCT Pub. No.: WO2006/058098
PCT Pub. Date: Jun. 1, 2006

(65) Prior Publication Data
US 2009/0303025 A1   Dec. 10, 2009

Related U.S. Application Data

(60) Provisional application No. 60/630,364, filed on Nov. 22, 2004.

(51) Int. Cl.
*B60R 25/10* (2006.01)
(52) U.S. Cl. ............ 340/429; 340/444; 340/573.1
(58) Field of Classification Search ............ 340/429, 340/426.27, 573.1, 438, 439, 447, 444, 463, 340/425.5, 554
See application file for complete search history.

(56) References Cited

U.S. PATENT DOCUMENTS

| | | | |
|---|---|---|---|
| 1,523,495 A | 1/1925 | Silberman | 362/501 |
| 1,629,456 A | 5/1927 | Pellegrini | 362/501 |
| 1,684,499 A | 9/1928 | Mayer | 292/336.3 |
| 1,721,347 A | 7/1929 | Macrae et al. | 362/501 |
| 2,117,160 A | 5/1938 | Gale | 292/336.3 |
| 2,360,227 A | 10/1944 | Hemphill | 362/464 |
| 2,688,865 A | 9/1954 | Foster et al. | 70/129 |
| 2,760,050 A | 8/1956 | Porsche | 362/501 |
| 3,016,968 A | 1/1962 | Lenz et al. | 180/82 |
| 3,241,344 A | 3/1966 | Peters | 70/279 |

(Continued)

FOREIGN PATENT DOCUMENTS

DE   2636099   2/1978

(Continued)

OTHER PUBLICATIONS

"Kit 62 Movement Detector Components", Sep. 24, 1994 p. 1-5.
International Search Report for corresponding International Application No. PCT/US05/42504, filed on Nov. 22, 2005.
Supplementary European Search Report for corresponding European patent Application No. 05852083.4-1264/1817760, dated Mar. 26, 2010.

*Primary Examiner* — Daniel Previl
(74) *Attorney, Agent, or Firm* — Gardner, Linn, Burkhart & Flory, LLP (57) ABSTRACT

An occupant detection system for detecting an occupant within a vehicle includes a sensor for sensing movement or acceleration of the vehicle, first and second processors and a decider. The sensor generates a sensor output. The first processor processes the sensor output in a first manner and generates a first output indicative of the possibility of the presence of an occupant within the vehicle. The second processor processes the sensor output in a second manner and generates a second output indicative of the possibility of the presence of an occupant within the vehicle. The decider processes the first and second outputs and determines whether the combination of the first and second outputs is indicative of an occupant in the vehicle.

22 Claims, 3 Drawing Sheets

U.S. PATENT DOCUMENTS

| | | | |
|---|---|---|---|
| 3,553,448 A | 1/1971 | Davis et al. .................. 240/7.1 |
| 3,582,639 A | 6/1971 | Chamberlain ................ 240/7.1 |
| 3,596,484 A | 8/1971 | Peters ............................ 70/240 |
| 3,678,716 A | 7/1972 | Cobb ................................ 70/92 |
| 3,759,556 A | 9/1973 | Wright ........................... 292/33 |
| 3,766,539 A | 10/1973 | Bradshaw et al. ............ 340/258 |
| 3,829,693 A | 8/1974 | Schwarz ....................... 250/338 |
| 3,839,640 A | 10/1974 | Rossin .......................... 250/353 |
| 3,956,732 A | 5/1976 | Teich .............................. 340/64 |
| 3,992,909 A | 11/1976 | McGhee ..................... 70/379 R |
| 4,007,955 A | 2/1977 | Kobayashi .................... 292/216 |
| 4,052,716 A | 10/1977 | Mortensen .................... 340/233 |
| 4,080,812 A | 3/1978 | Knott ............................. 70/256 |
| 4,122,371 A | 10/1978 | Talmage et al. ............... 315/84 |
| 4,127,966 A | 12/1978 | Schmidt .......................... 49/141 |
| 4,155,233 A | 5/1979 | Lira ................................. 70/92 |
| 4,166,955 A | 9/1979 | Keller .......................... 250/342 |
| 4,242,669 A | 12/1980 | Crick ............................ 340/567 |
| 4,312,197 A | 1/1982 | Carrion et al. ................. 70/135 |
| 4,318,089 A | 3/1982 | Frankel et al. ............... 340/567 |
| 4,322,959 A | 4/1982 | Mochida ......................... 70/241 |
| 4,342,210 A | 8/1982 | Denningham .................. 70/278 |
| 4,365,232 A | 12/1982 | Miller ........................... 362/464 |
| 4,371,205 A | 2/1983 | Kaveney, Jr. .................. 292/48 |
| 4,379,971 A | 4/1983 | Smith et al. .................. 250/342 |
| 4,384,207 A | 5/1983 | Doctor ......................... 250/349 |
| 4,418,335 A | 11/1983 | Genähr ......................... 340/565 |
| 4,437,003 A | 3/1984 | Doctor ......................... 250/338 |
| 4,441,023 A | 4/1984 | Doctor et al. ................ 250/338 |
| 4,464,649 A | 8/1984 | Her ................................. 340/72 |
| 4,468,657 A | 8/1984 | Rossin .......................... 340/555 |
| 4,482,179 A | 11/1984 | Johnson ..................... 292/336.3 |
| 4,507,654 A | 3/1985 | Stolarczyk et al. .......... 340/545 |
| 4,546,417 A | 10/1985 | Watts ............................. 362/84 |
| 4,556,796 A | 12/1985 | Renals .......................... 250/338 |
| 4,604,524 A | 8/1986 | Kotlicki et al. ............... 250/342 |
| 4,612,442 A | 9/1986 | Toshimichi .................. 250/353 |
| 4,645,233 A | 2/1987 | Bruse et al. .................. 280/808 |
| 4,667,990 A | 5/1987 | Quantz ........................ 292/201 |
| 4,697,081 A | 9/1987 | Baker ........................... 250/338 |
| 4,704,533 A | 11/1987 | Rose et al. ................... 250/342 |
| 4,709,153 A | 11/1987 | Schofield ..................... 250/353 |
| 4,745,284 A | 5/1988 | Masuda et al. ............. 250/338.3 |
| 4,746,910 A | 5/1988 | Pfister et al. ................. 340/567 |
| 4,752,768 A | 6/1988 | Steers et al. ................. 340/567 |
| 4,764,755 A | 8/1988 | Pedtke et al. ................ 340/541 |
| 4,775,347 A | 10/1988 | Takada et al. ................. 445/44 |
| 4,796,013 A | 1/1989 | Yasuda et al. ................ 340/562 |
| 4,797,657 A | 1/1989 | Vorzimmer et al. ......... 340/541 |
| 4,825,079 A | 4/1989 | Takamatsu et al. ........ 250/338.3 |
| 4,848,114 A | 7/1989 | Rippe ............................. 70/263 |
| 4,848,509 A | 7/1989 | Bruhnke et al. .............. 180/287 |
| 4,857,912 A | 8/1989 | Everett, Jr. et al. ........ 340/825.3 |
| 4,868,390 A | 9/1989 | Keller et al. ................ 250/338.3 |
| 4,881,148 A | 11/1989 | Lambropoulos et al. ..... 361/172 |
| 4,895,009 A | 1/1990 | Kleefeldt et al. .............. 70/264 |
| 4,928,212 A | 5/1990 | Benavides ...................... 362/61 |
| 4,930,864 A | 6/1990 | Kuster et al. ................. 350/167 |
| 4,933,668 A | 6/1990 | Oyer et al. ................... 340/541 |
| 4,952,808 A | 8/1990 | Turnbull et al. ........... 250/338.3 |
| 4,954,813 A | 9/1990 | August, Sr. et al. ......... 340/571 |
| 4,979,384 A | 12/1990 | Malesko et al. ............... 70/241 |
| 4,981,314 A | 1/1991 | Carr ............................. 292/347 |
| 4,982,094 A | 1/1991 | Matsuda ...................... 250/342 |
| 5,003,800 A | 4/1991 | Bublewicz ..................... 70/264 |
| 5,027,104 A | 6/1991 | Reid ............................ 340/541 |
| 5,030,012 A | 7/1991 | Hagins et al. .................. 374/31 |
| 5,045,702 A | 9/1991 | Mulleer ........................ 250/342 |
| 5,054,686 A | 10/1991 | Chuang ....................... 236/49.3 |
| 5,054,826 A | 10/1991 | Dow et al. .................... 292/125 |
| 5,063,371 A | 11/1991 | Oyer et al. ................... 340/541 |
| 5,071,160 A | 12/1991 | White et al. ................. 280/735 |
| 5,077,549 A | 12/1991 | Hershkovitz et al. ........ 340/567 |
| 5,084,696 A | 1/1992 | Guscott et al. ............... 340/541 |
| 5,093,656 A | 3/1992 | Dipoala ........................ 340/522 |
| 5,166,679 A | 11/1992 | Vranish et al. ........... 340/870.37 |
| 5,174,643 A | 12/1992 | Priesemuth .................... 362/61 |
| 5,216,407 A | 6/1993 | Hwang ........................ 340/426 |
| 5,219,413 A | 6/1993 | Lineberger ................... 180/272 |
| 5,231,359 A | 7/1993 | Masuda et al. ............... 324/675 |
| 5,276,772 A * | 1/1994 | Wang et al. .................... 706/20 |
| 5,283,551 A | 2/1994 | Guscott ........................ 340/567 |
| 5,297,010 A | 3/1994 | Camarota et al. ............. 362/80 |
| 5,317,620 A | 5/1994 | Smith ............................ 379/40 |
| 5,349,329 A | 9/1994 | Smith ........................... 340/539 |
| 5,383,703 A | 1/1995 | Irvine, III .................... 296/181 |
| 5,404,128 A | 4/1995 | Ogino et al. ............... 340/425.5 |
| 5,406,171 A | 4/1995 | Moody ........................... 315/77 |
| 5,409,273 A | 4/1995 | Claar et al. .................. 292/201 |
| 5,424,711 A | 6/1995 | Müller et al. ................ 340/426 |
| 5,424,712 A | 6/1995 | Rosenberger ................ 340/426 |
| 5,424,718 A | 6/1995 | Müller et al. ................ 340/567 |
| 5,445,326 A | 8/1995 | Ferro et al. .................. 292/336 |
| 5,482,314 A * | 1/1996 | Corrado et al. .............. 280/735 |
| 5,486,810 A | 1/1996 | Schwarz ...................... 340/521 |
| 5,512,836 A | 4/1996 | Chen et al. ................... 324/687 |
| 5,525,843 A | 6/1996 | Höwing ....................... 307/9.1 |
| 5,550,677 A | 8/1996 | Schofield et al. ............ 359/604 |
| 5,580,153 A | 12/1996 | Motz ............................. 362/80 |
| 5,581,230 A | 12/1996 | Barrett ......................... 340/332 |
| 5,585,625 A | 12/1996 | Spies ............................ 250/221 |
| 5,636,536 A | 6/1997 | Kinnucan ...................... 70/107 |
| 5,663,704 A | 9/1997 | Allen et al. .................. 340/426 |
| 5,670,935 A | 9/1997 | Schofield et al. ............ 340/461 |
| 5,680,096 A * | 10/1997 | Grasmann ................ 340/426.27 |
| 5,693,943 A | 12/1997 | Tchernihovski et al. ..... 250/342 |
| 5,711,559 A | 1/1998 | Davis ........................... 292/340 |
| 5,719,551 A | 2/1998 | Flick ............................ 340/426 |
| 5,724,024 A | 3/1998 | Sonderegger et al. |
| 5,726,629 A | 3/1998 | Yu ................................ 340/565 |
| 5,737,083 A | 4/1998 | Owechko et al. ............ 356/375 |
| 5,793,291 A | 8/1998 | Thornton ..................... 340/573 |
| 5,796,094 A | 8/1998 | Schofield et al. .......... 250/208.1 |
| 5,802,479 A | 9/1998 | Kithil et al. .................... 701/45 |
| 5,805,056 A | 9/1998 | Mueller et al. ............... 340/426 |
| 5,808,552 A | 9/1998 | Wiley et al. |
| 5,848,802 A | 12/1998 | Breed et al. .................. 280/735 |
| 5,859,479 A | 1/1999 | David .......................... 307/10.8 |
| 5,887,466 A | 3/1999 | Yoshizawa ..................... 70/257 |
| 5,914,610 A | 6/1999 | Gershenfeld et al. ......... 324/663 |
| 5,933,090 A | 8/1999 | Christenson ............. 340/825.69 |
| 5,938,321 A | 8/1999 | Bos et al. ..................... 362/494 |
| 5,949,340 A | 9/1999 | Rossi ......................... 340/573.1 |
| 5,986,549 A | 11/1999 | Teodorescu .................. 340/561 |
| 6,018,292 A | 1/2000 | Penny, Jr. .................... 340/426 |
| 6,024,388 A | 2/2000 | Tomah et al. ................ 292/216 |
| 6,028,509 A | 2/2000 | Rice ............................ 340/449 |
| 6,051,981 A | 4/2000 | Gershenfeld et al. ......... 324/663 |
| 6,067,019 A | 5/2000 | Scott |
| 6,086,131 A | 7/2000 | Bingle et al. ................... 296/76 |
| 6,091,322 A | 7/2000 | Ang et al. .................. 340/425.5 |
| 6,104,293 A | 8/2000 | Rossi ......................... 340/573.1 |
| 6,130,614 A | 10/2000 | Miller et al. ............... 340/573.4 |
| 6,135,514 A | 10/2000 | Kowalewski et al. ......... 292/216 |
| 6,139,172 A | 10/2000 | Bos et al. ..................... 362/494 |
| 6,166,625 A | 12/2000 | Teowee et al. ............... 340/426 |
| 6,209,933 B1 | 4/2001 | Ang et al. ....................... 296/76 |
| 6,222,442 B1 | 4/2001 | Gager et al. .................. 340/426 |
| 6,254,261 B1 | 7/2001 | Bingle et al. ................. 362/501 |
| 6,275,146 B1 | 8/2001 | Kithil et al. ................ 340/425.5 |
| 6,335,687 B1 | 1/2002 | Terashima et al. .......... 340/573.1 |
| 6,339,376 B1 | 1/2002 | Okada .......................... 340/562 |
| 6,349,984 B1 | 2/2002 | Marrazzo et al. ........... 292/336.3 |
| 6,356,854 B1 * | 3/2002 | Schubert et al. .............. 702/150 |
| 6,390,529 B1 | 5/2002 | Bingle et al. |
| 6,460,906 B2 | 10/2002 | Bingle et al. |
| 6,480,103 B1 | 11/2002 | McCarthy et al. |
| 6,485,081 B1 | 11/2002 | Bingle et al. |
| 6,515,582 B1 | 2/2003 | Teowee et al. |
| 6,578,871 B2 | 6/2003 | Gray et al. |
| 6,587,770 B1 | 7/2003 | Gray et al. |
| 6,690,268 B2 | 2/2004 | Schofield et al. |
| 6,753,780 B2 * | 6/2004 | Li ............................... 340/573.1 |
| 6,768,420 B2 | 7/2004 | McCarthy et al. |
| 6,783,167 B2 | 8/2004 | Bingle et al. |
| 7,097,226 B2 | 8/2006 | Bingle et al. |
| 2006/0290518 A1 | 12/2006 | Bingle et al. |

FOREIGN PATENT DOCUMENTS

| | | |
|---|---|---|
| DE | 3732936 | 9/1987 |
| DE | 9006007 | 6/1991 |
| EP | 0235372 | 11/1986 |
| GB | 2252438 A | 8/1992 |
| GB | 2266799 A | 11/1993 |
| WO | WO 9739920 | 10/1997 |

\* cited by examiner

Several heart beats, sensor placed onto chest    FIG. 3

FIG. 5

Heart beat frequency spectrum            FIG. 4

P - Heart beats, sensor on chest    V - Chassis mounted sensor    FIG. 6

OCCUPANT DETECTION SYSTEM FOR VEHICLE

CROSS REFERENCE TO RELATED APPLICATION

The present application is a 371 national phase application of PCT Application No. PCT/US2005/042504, filed Nov. 22, 2005, which claims benefit of U.S. provisional application Ser. No. 60/630,364, filed Nov. 22, 2004, which are hereby incorporated herein by reference in their entireties.

FIELD OF THE INVENTION

The present invention relates generally to occupant detection systems for detecting an occupant in a vehicle.

BACKGROUND OF THE INVENTION

A modern car is almost impossible to steal without a car key. Therefore, a possible scenario for a car thief could be to sneak into a car at a supermarket before the car was locked and before the alarm was activated, and then hide, still enough to not be visible by the ordinary alarm system, and when the owner arrives, threaten the owner to get the car key. Another scenario occurs after the ordinary alarm has triggered. What to do when approaching the car? Is there someone still in the car? Both of these situations pose serious threats to the person approaching the car.

Therefore, there is a need in the art to provide an occupant detection system for detecting an occupant in a vehicle that overcomes the shortcomings of the prior art.

SUMMARY OF THE INVENTION

The present invention provides an occupant detection system for detecting an occupant in a vehicle. The occupant detection system includes a sensor, such as an accelerometer or the like, that senses movement of the vehicle, and at least two separate processing algorithms or networks that process the output data of the sensor and provide a determination as to whether or not an occupant is present and a certainty rating or qualification of the determination. A decider or control then compares the outputs of the algorithms or networks and decides whether or not the combined outputs are indicative of an occupant in the vehicle. The control may then generate an appropriate response or output. The occupant detection system of the present invention is particularly suited for use in a vehicle and for detecting the presence of an occupant within the vehicle.

The occupant detection system may be operable in response to a person or owner activating the system via a remote user interface device, such as a remote key fob or the like, or may be operable in response to an activation or setting off of the vehicle alarm, or other incident or event that may be indicative of an occupant in the vehicle. The occupant detection system may provide an alert to the driver or user (such as via an alert at the vehicle or at the remote interface device) if an occupant is detected, so that the person knows to be careful when approaching the vehicle or to call for assistance.

A purpose of the occupant sensor or detecting system of the present invention is to enable a remote detection, via a key fob, of an occupant in each of these cases.

These and other objects, advantages, purposes and features of the present invention will become apparent upon review of the following specification in conjunction with the drawings.

DESCRIPTION OF THE PREFERRED EMBODIMENTS

Figure 1:
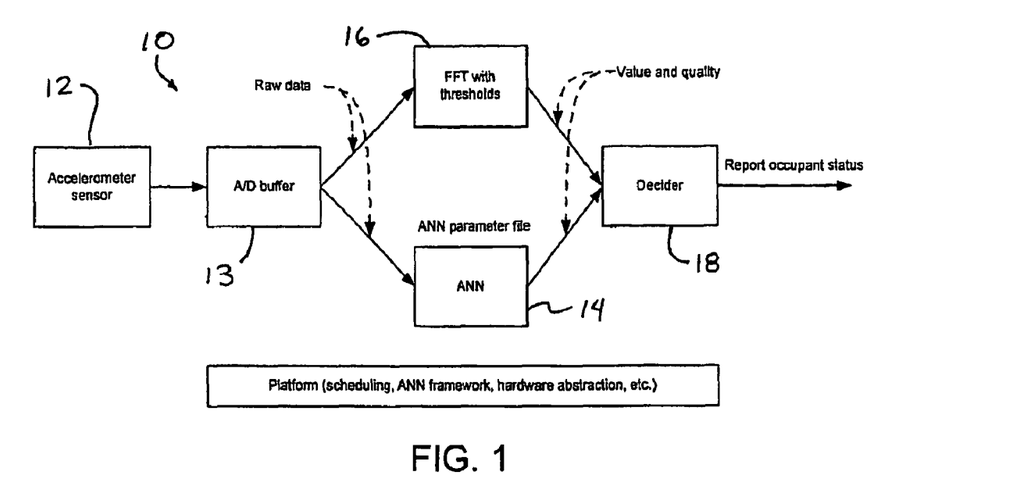
FIG. 1 is a block diagram of an occupant detection system in accordance with the present invention.

The present invention provides an occupant detection system 10 (FIG. 1), which includes a measurement device or sensor, such as a very sensitive accelerometer sensor 12, which detects movement of the vehicle and generates an output signal indicative of the detected movement. The output signal is fed to or communicated to an analogue/digital buffer 13, and the output (such as raw data or the like) of the buffer is processed by two distinct algorithms or networks, such as an artificial neural network (ANN) 14 and a Fast Fourier transform (FFT) algorithm 16, each of which provides an output that indicates whether or not the respective network or algorithm concludes that an occupant is present in the vehicle (such as within an interior cabin of the vehicle and/or within a trunk compartment of the vehicle or the like) and a confidence or value or quality characteristic of the respective conclusion. A decider or control 18 receives the value and quality signals from the network and algorithm and determines whether or not the two signals cooperate or combine to indicate that an occupant is present in the vehicle. The decider then generates an output signal to the user that reports the occupant status of the vehicle, such as by indicating whether or not an occupant has been detected within the vehicle.

Even if a person tries to sit very still there are some movements that cannot be controlled, for instance the heart beat and the blood flow. In silent conditions these periodic heart beat related activities will accelerate the whole vehicle and these oscillations can be observed. In the occupant detection system of the present invention, the accelerometer detects small and large movements of the vehicle and generates an output signal indicative of those movements. The output signal of the accelerometer is interpreted by two different algorithms. For example, the signal may be interpreted by the artificial neural network (ANN), with a primary focus on detecting a person sitting still, or trying to hide, while the signal may also be interpreted by the Fast Fourier transform (FFT) algorithm, with a focus on trying to detect a moving person. The decider or control or the like may analyze or compare the output of both of the ANN and FFT algorithm and make a decision as to whether or not the combination of the outputs is indicative of an occupant being within the vehicle.

Figure 2:
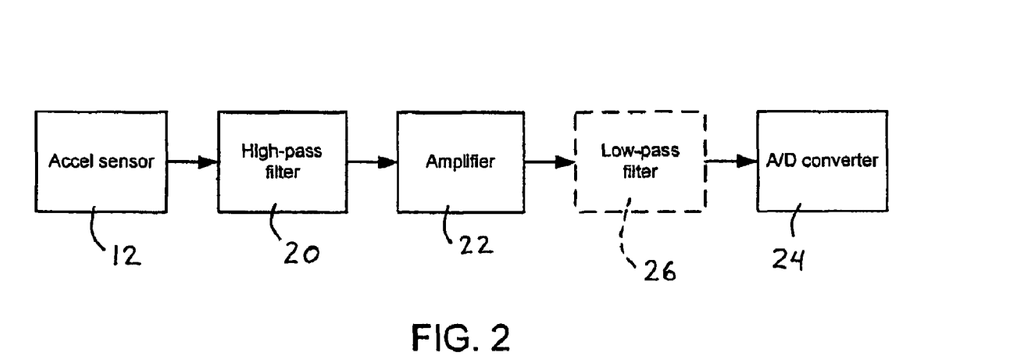
FIG. 2 is a block diagram of a sensing device useful in the occupant detection system of FIG. 1.

The output of the accelerometer 12 may pass through a highpass filter 20, an amplifier 22, such as an op-amp or the like, and an analogue to digital converter 24, as shown in FIG. 2. First in the chain is the accelerometer or sensor. The sensor may comprise any sensitive accelerometer or the like, such as a SCA620-series accelerometer, which is sensitive in the z-axis, with a resolution of about 2 V/g (with about 1.2 V/g to be used in the particular application). Since the sensor output is affected by its own gravitational force, a high-pass filter may be used to remove the DC component of the signal. The high-pass filter may be a simple 3 dB RC-filter with as low a high-pass point as possible. The cut-off frequency may be set to about 0.3 Hz (input impedance of opamp about 1 MΩ, resistance R=470 kΩ, C=1 µF→3.3 sec.). Optionally, after the signal has been amplified, a low-pass filter 26, such as a high-order Butterworth low pass-filter, may be implemented (or such a filter may be implemented in the software, such that the low pass filter shown in FIG. 2 may not be needed). Implementing the low pass filter in the software may be preferred since this would enable re-use of previous recorded training sets if, for instance, a change is needed in the low pass filter. Regarding error propagation, the output noise from the sensor is typically 20 µg/√Hz, and it is noted that an analogue low pass filter may be desirable due to the fact that that this removes some of the noise generated by the sensor. In order to get the same noise reduction, using a software filter, there is a need to over-sample the signal since there is more noise propagated through the A/D-stage.

The measurement range used may be +/−100 mV, i.e. an amplification of the original signal by 5 V/200 mV=25 times. In exemplary embodiments, the amplifier in the A/D converter may comprise an LT1114CN and/or the A/D converter is an LTC1282BCN. However, other suitable components and circuitry may be utilized without affecting the scope of the present invention.

Figure 2A:
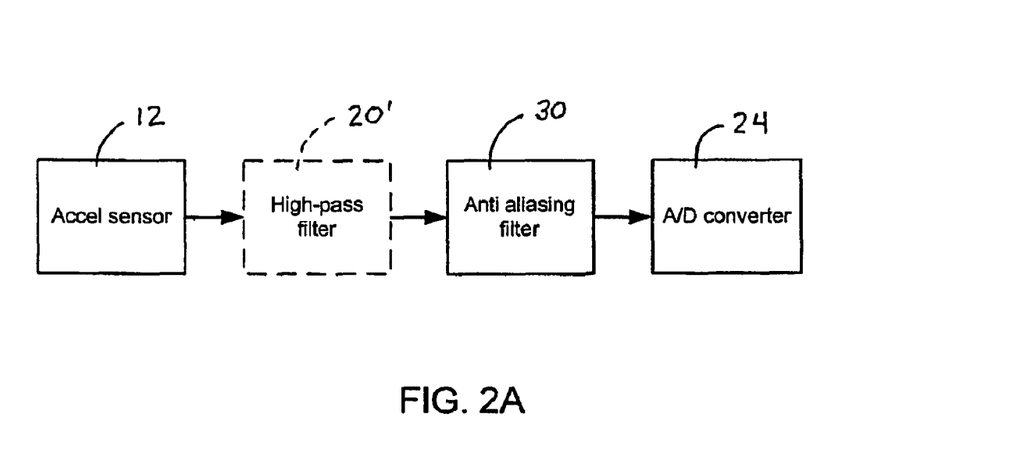
FIG. 2A is a block diagram of another sensing device useful in the occupant detection system of the present invention.

Optionally, and as shown in FIG. 2A, the output of the accelerometer or sensor 12 may pass through a signal conditioning filter 20', an anti-aliasing filter 30 and an analogue to digital converter 24. First in the chain is the accelerometer sensor, which may comprise any suitably sensitive accelerometer or the like, such as a SCA620-series accelerometer, which is sensitive in the z-axis, with a resolution of about 2 V/g (with about 1.2 V/g to be used in the particular application). Since the accelerometer sensor may be affected by its own gravitational force, a signal conditioning filter may be needed. The signal conditioning filter may be implemented as a high-order Butterworth filter (or such a filter may be implemented in software). Implementing the signal conditioning filter in software may be preferred since this would enable re-use of previous recorded training sets if, for instance, a change is needed or desired in the signal conditioning filter. The anti-aliasing filter can be implemented as a simple 3 dB RC-filter or better (such as an RC-filter having the following characteristics: R=100 k, C=10 n) or other suitable type of filter, without affecting the scope of the present invention. Regarding error propagation, the output noise from the sensor is typically 20 µg/√Hz, and it is noted that an analogue low-pass stage in the signal conditioning filter may be desirable due to the fact that that this removes some of the noise generated by the sensor. In order to get the same or similar noise reduction using a software filter, it may be desirable or necessary to over-sample the signal, since there is more noise propagated through the A/D-stage. The analogue to digital converter may comprise any suitable converter, such as a Texas Instruments ADS1224 A/D converter with 24-bits resolution, or the like, without affecting the scope of the present invention.

The output of the accelerometer may be processed by the ANN and the FFT algorithm to separately and independently arrive at two results, which may be the same result (both conclude that an occupant is or is not present) or different result (one concludes that an occupant is present, while the other concludes that an occupant is not present), as discussed below. In order to determine the appropriate parameters for comparison of the output data to, so as to detect an occupant in the vehicle, even if the occupant is very still, several parameters have been tested to accumulate data indicative of various conditions. The output data of the accelerometer may be compared to such accumulated data to determine if the output data is indicative of an empty vehicle or of an occupant in the vehicle.

Preferably, the system is operable to detect and recognize a biometric characteristic or parameter, such as a human heartbeat or pulse or the like, that is indicative of the presence of a living being, such as a human being, within the vehicle. The system may detect the presence of a living being within the interior cabin of the vehicle, and/or may detect the presence of a living being within a trunk compartment of the vehicle or the like.

Figure 3:
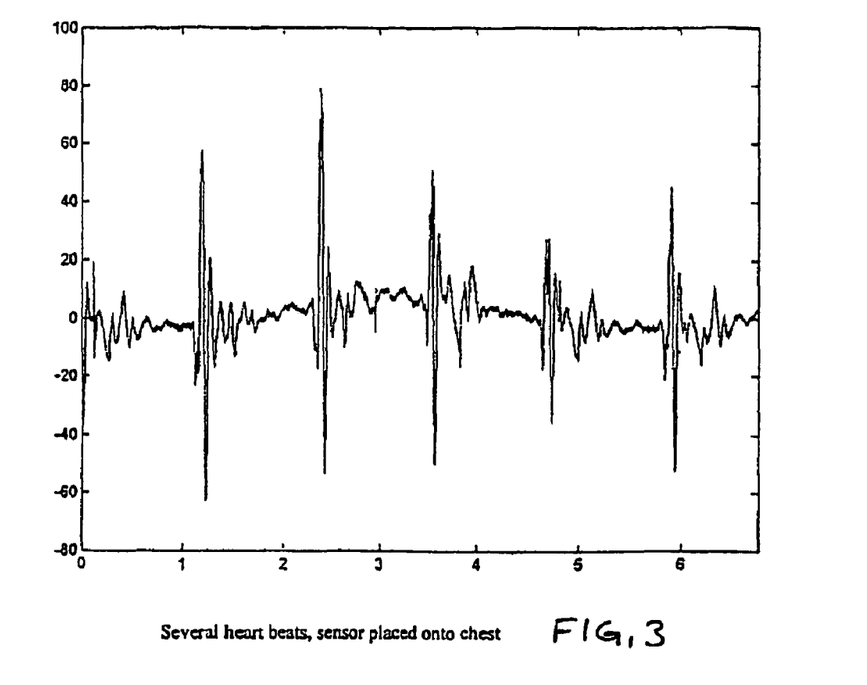
FIG. 3 is a graph of a typical human heartbeat.
Figure 4:
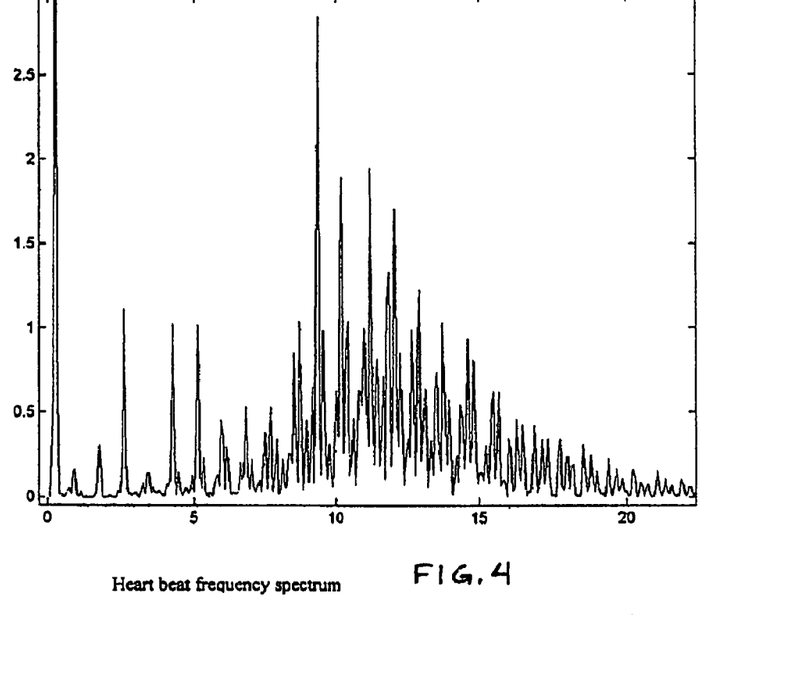
FIG. 4 is a graph of a typical human heartbeat frequency spectrum.

Testing has shown that a human heartbeat consists of several typical phases, such as four phases in one heart beat FIG. 3 shows a typical heartbeat, with the sensor placed on the person's chest. The different phases are difficult to uniquely identify, but several patterns are repeated each heart beat. The corresponding frequency spectrum is shown in FIG. 4. The heart beat may be detected or distinguished by analysing the accelerometer output and determining if the distinguishing features of a heartbeat are present in the output signal or data. For example, the different phases of the heartbeat may be detected or recognized. One further way of distinguishing the heartbeat could be to distinguish or recognize the diastolic/systolic phases of a heartbeat or other phases or characteristics of the heartbeat.

An important observation is that the main amplitudes in the spectrum are around 10 Hz, and that the peaks are visible in multiples of the 'fundamental tone', the pulse of the heart beat. An interesting approach to the problem of identifying a known pattern, in this case a person's heart beat, might be some sort of correlation or prediction algorithm. However, there are several drawbacks to such an approach:

- The pulse can be considered to be in the range 40-200 beats/minute, which makes prediction of the pulse train hard, i.e. the tracking window for each new pulse is very indefinite, implying rather high performance needs.
- The exact pattern of a heart beat is very different from person to person. Studies of about ten different individuals have been made, and the heart beat itself is easily recognizable for each person but the exact pattern is very different for each person.
- The amplitude and frequency impact to the chassis movement is of the same or lower magnitude as a moving person.

Note that the above drawbacks are valid when searching for the direct heartbeat. A correlation approach may well be used by looking for oscillations at around 6 Hz.

Artificial Neural Network

In order to determine what signals are indicative of an occupant or person within the vehicle, data may be collected for a particular vehicle or type of vehicle, since some of the measured movements and accelerations may vary between vehicles. The data is compiled and the ANN is "trained" so that certain types of signals may be recognized as acceptable signals that are not indicative of a person or occupant within the vehicle.

The approach of getting acceptable performance of an ANN based approach is to capture a lot of realistic data from different locations and with different people. After the ANN has been trained on lots of data, it may generalize the data into characteristics of an empty or occupied car, and when presented to previously unseen situations and people it will behave as expected. For example, data has been collected to train the ANN for a variety of conditions and locations, and a great number of measurements have been performed in a number of different environments with a focus on harsh environments, assumed to make detection of an occupant using an accelerometer difficult. Below is a list of sample environments where measurements may be performed (these environments and others are suitable for use with either or both the ANN approach and/or the FFT algorithm approach discussed below):

different parking garages, both empty and with traffic;
different parking places very close to heavy traffic;
at the sea-side in strong wind;
close to highway heavy traffic;
close to accelerating/retarding traffic;
empty parking places;
heavy rain conditions; and/or
vehicle on rim only (i.e. no tires).

Because the ANN functions to recognize known conditions or collected data, the ANN may not be suitable to accurately signal that there is an occupant, when an occupant is very still in the vehicle, and the vehicle characteristics thus may be similar to those of an empty vehicle. The ANN thus may provide incorrect results when the occupant hides and tries to be very still.

Fast Fourier Transform

To evaluate robustness issues, the FFT-based algorithm is implemented. The FFT algorithm is based on 'max-min' observations and may be further refined. The reason for refinement is that, during harsh conditions, there may be recordings made with an empty car, which exceed silent recordings (during non-harsh conditions) with a person inside. This observation has led to a detection algorithm that, for every frequency bin, has a threshold value that depends on previous recordings and the total energy in the current recording. If a new recording has an amplitude which is more than twice the amplitude of the current threshold for that frequency, it is considered a strong indicator that there is a person in the car. First, all measurements are divided in two sections, separated by a line between origo and the maximum amplitude observed for the specific bin. After this, there is a least square approximation of the points above the origo-max line. A new line with gradient according to the least square approximation and an offset to cover all measurements will serve as the threshold.

Figure 5:
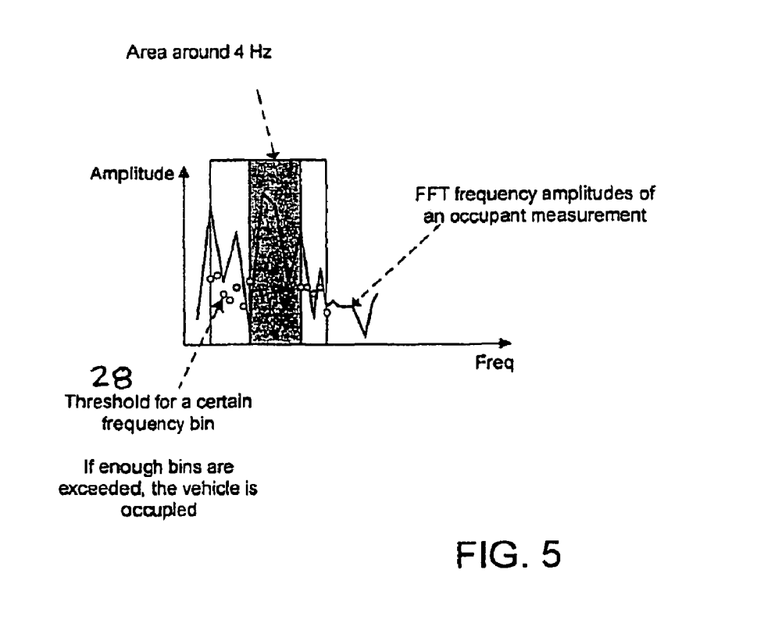
FIG. 5 is a graph of vibrations detected by the occupant detection system of FIG. 1.

With respect to the FFT algorithm or approach, the approach starts off in a 'max-min' approach, described below. The principle is that there are thresholds associated to certain frequencies, but not to all frequencies. For example, some frequencies around 4 Hz may be blocked completely (such as shown in FIG. 5). Preferably, several thresholds may be exceeded before a recording is identified as an occupied recording.

Each threshold is related to a specific frequency bin. The reason for needing many bins is that in some locations, there is transient noise from various devices, such as, for instance, fans, motors and/or the like. In a location with transient noise, if the threshold frequencies were not many enough, the system may always or nearly always report an occupant in the car, regardless of whether or not an occupant was actually present. The principle is shown in FIG. 5. There are a number of threshold values 28, and if enough of the threshold values are exceeded at the respective frequency (as shown in FIG. 5), then the measurement is considered as an occupied recording (and thus indicative of an occupant in the vehicle). By optimizing how many thresholds and which levels, it is possible to tune the performance of the algorithm.

The 'max-min' approach thus is used to analyse different conditions. In order to determine how a given environment 'behaves', several recordings may be made and transformed to the frequency domain, and for each frequency bin the maximum and minimum amplitudes, over the selected recordings, are extracted. By analysing an empty car, max and min data for each frequency may be plotted or analysed, and analysing an occupied car, max and min data may be plotted and analysed. Based on test results it was learned that at below about 6 Hz, the maximum data over a number of empty recordings (with no occupant present in the vehicle) was below the minimum data over a number of occupied recordings (with an occupant present in the vehicle). This indicates that there may be something uniquely human at that frequency. It is worth rioting that when analysing different persons it has been more difficult to detect heavy persons, with a weight over 100 kg, sitting still. This is maybe not what is expected, but it may be due to the fact that the heart is more embedded in some persons, maybe due to overweight conditions or other health/physical conditions.

Figure 6:
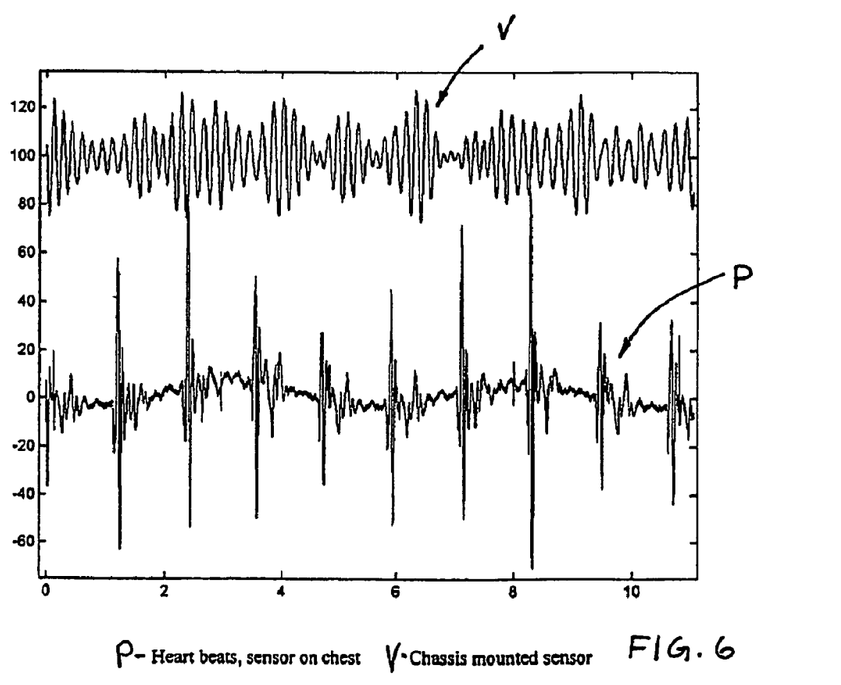
FIG. 6 is a graph of a typical human heartbeat and of the heartbeat as detected by a chassis mounted sensor or sensing device.

If one of the recordings with a human present is band pass filtered at about 6 Hz, the impact on the chassis posed by the heart movement is readily apparent. As shown in FIG. 6, the top graph or plot V represents the accelerations measured by a sensor placed at the intended sensor location and band pass filtered around 6 Hz, and the bottom graph or plot P represents a recording with a sensor placed on the chest on a person sitting in the car. Note also the very slow oscillation of the base line, this is the DC-offset of the inclination change due to breathing. If other frequencies are investigated, for instance at about 1.5 Hz and 4 Hz, there is nothing that relates to the heart beat. At about 12 Hz, however, there is a pattern similar to the 6 Hz pattern. This seems logical since it is probably overtones to the 6 Hz pulse.

Analysis of person movement shows, as expected, an 'infinite' range of patterns. Large movements, however, are of much more significant amplitude than empty car recordings and are therefore easy to distinguish. Still movements are not as significant as it would be possible to look at only, for instance, power over a simple range in the frequency spectra. As soon as there are moderate movements there is no observable pattern round 6 Hz at all.

During testing, the FFT algorithm or method was very successful in making intrusion detections. Some benefits include:

'Training' of the threshold is made only with an empty car; and
It is easy to make different kinds of recording during different conditions to analyse how robust the detection is.
Some possible drawbacks to this approach include:
Concerns as to whether the threshold function converges when the number of measurements increases, or will the thresholds just grow infinite?

For example, what identifies wind, is it a 20 second recording, or 1000000 recordings (the correct answer is of course, an infinite number, but the assumption is to reach an acceptable level of performance). In other words, if the threshold values continue to grow when capturing 'normal' empty situations, the detection of occupants will be more and more difficult. This is especially true for occupants trying to hide, since they may have very little impact on the vehicle.

This approach is used to be able to look at robustness as a function of sample rate, resolution and recording length as well as analysing different kinds of environmental conditions. A demonstrator based on this algorithm has also been developed. Detection time has been about 5 seconds. The demonstrator has made it possible to get quick feedback from detections. Some of the lessons learned from the demonstrator are:

When measuring indoors in well used parking garages, with lots of transient noises (doors slamming, cars passing, car wash nearby, etc), a lot of empty recordings are desired to get good thresholds.

As soon as a person moves in the car this is easily detected.

When analysing detection time needed vs. amplitude of detection, one important observation with this analysis is how the certainty of observation clearly increases with detection time. It seems as if this function converges, i.e. there is an upper limit of detection time above which, no further confidence in measuring will be obtained (this is of course assuming that an occupant can be still forever).

Factors Affecting Results

Other factors may affect the impact on the results obtained from the max-min method due to several different environments. For example, below is a summary of lessons learned during testing.

In the study so far, there are differences identified between car models, regarding where the resonance peaks are located, but different variants of the same car model look similar in the measurements performed. However, in 'real world' observations, there are very low amplitudes in the resonance frequency regions, which indicates that different car chassis settings will have little impact on the detection system.

The sensor placement in the vehicle also may affect the amplitude of the measurements, but when having a placement with lower amplitudes, the relationship between amplitudes are very much the same and still rises above the signal chain noise with sufficient margin.

Also, fast moving traffic affects the vehicle mostly around 4 Hz, but does not affect the vehicle much at frequencies above about 5 Hz.

High winds may also have some affect on the results. One interesting observation made refers to the fact that there are greater amplitudes over a broader frequency range, but there is still not much disturbance in the 6 Hz region. Compared to traffic measurements, one difference is that the peaks around 4 Hz are much less distinct with strong winds. This may be due to the simple fact that wind affects the chassis from different angles while the low-frequency traffic 'noise' (ground vibration) is only distributed from the ground through the tires.

Testing has shown that the frequency decreases with the load of the vehicle, which is an observation that may be used in an algorithm.

When placing the car on rims one interesting observation has been made: all frequency components in the region between 4 Hz to 6 Hz disappear. This implies that all 4 Hz peaks are caused by, or at least connected to, tire vibrations. Regarding the 6 Hz components, they also seem to be tightly connected to the tires. Therefore, the system may perform differently with different kinds of tires.

Rain measurements have been performed and the results tend to show that rain from above does not affect the vehicle very much.

Other environments that may affect the sensor results include some parking decks and downtown parking garages. Fans, compressors, slow-moving cars, etc. may have major affects on the vehicle.

Decider or Control

The outputs of the ANN and FFT algorithm are processed and analyzed and compared by the secondary mechanism added after the two algorithms, and that is a decider or control or processor. The decider considers the output or analysis of both the ANN and the FFT algorithm, and decides whether or not the combined outputs are indicative or representative of an occupant being within the vehicle. A quality of the response is assigned to the actual response from each of the algorithms.

A quality measure is thus added for the ANN, such that the output of the ANN provides a decision characteristic (is there an occupant detected in the vehicle by the ANN?) and a quality or confidence characteristic (how certain is the decision?). The quality of an ANN measurement is how stable the ANN output is over the last segments of output data. If all output data from both algorithms point in a certain direction or toward a certain result, i.e. occupant or no occupant, then it is considered high quality. If, however, the output data is quite indecisive, but still points in a certain direction, the quality is medium, and if there is no clear answer the result is uncertain.

A quality measure is also added for the FFT algorithm, such that the output of the FFT algorithm provides a decision characteristic (is there an occupant detected in the vehicle by the FFT algorithm?) and a quality or confidence characteristic (how certain is the decision?). In this case, it is the number of frequency bins that have an amplitude that exceeds the threshold that will give the quality of the measure. If all bins are over the threshold, the quality is high, while if more than a high percentage of the thresholds are exceeded it is a medium quality, and less than this, but still more than half of the bins, it is an uncertain quality. Regarding a case when not enough thresholds are exceeded, the measurement is considered indicative of an empty or non-occupied vehicle, but at most at a medium quality decision. In other words, the FFT algorithm cannot have too much influence in declaring such a detection or measurement as empty, since it is optimized on detecting large amplitudes.

The Decider receives the results with a quality or qualification rating from each of the algorithms, and due to the properties of each algorithm (i.e. the characteristics that the FFT is more suited for detecting movement of an occupant, while the ANN is more suited for detecting a still or unoccupied or empty vehicle), a simple rule based decision is made. The first rule of the list below that matches the results from the FFT and ANN algorithms is used to decide whether or not an occupant is present in the vehicle:

If the FFT reports occupant with high quality, then the system will report that an occupant is present (since the FFT algorithm is considered more suited for detecting movement of an occupant when it comes to large movements).

If the ANN reports empty with high quality, then the system will report that the vehicle is empty or that there is no occupant (since the ANN algorithm is considered more suited for detecting silent conditions).

If both algorithms report with medium quality, but one says that there is an occupant and the other says that there is no occupant, the decider will report or decide that an occupant is present (since it is better to give feedback that the user should be careful, i.e. it is the safest alternative).

If both algorithms report with low quality, but one says that there is an occupant and the other says that there is no occupant, the decider will report or decide that an occupant is present (since it is better to give feedback that the user should be careful, i.e. it is the safest alternative).

If both algorithms report with medium or low quality that no occupant is present, then the decider will decide or report that no occupant is detected.

Preferably, the occupant detector system is operable or is activated in response to an activating event, such as when one of the following conditions occur:

The burglar alarm system is triggered; and/or

The key fob (or other remote device) is pressed by the customer, asking for an occupant check.

Therefore, the present invention provides an occupant detection system that may detect an occupant in a vehicle, even when the occupant is very still or substantially not moving. The occupant detection system measures vehicle movement or acceleration and compares the output data of at least two distinct networks or algorithms, in order to decide whether or not the data is indicative of an occupant within the vehicle. The occupant detection system may then provide an alert to the user that a person has been detected within the vehicle. The occupant detection system of the present invention is particularly suited for detecting an occupant within a vehicle and may be mounted or positioned on or within the vehicle, so that the sensor or accelerometer detects vibration or movement of the vehicle, such as due to movement of an occupant within the vehicle or due to the heartbeat of an occupant within the vehicle.

Changes and modifications to the specifically described embodiments may be carried out without departing from the principles of the present invention, which is intended to be limited only by the scope of the appended claims, as interpreted according to the principles of patent law.

The invention claimed is:

1. An occupant detection system for detecting an occupant within a vehicle, said occupant detection system comprising:
    a sensor for sensing movement within the vehicle, said sensor generating a sensor output;
    a first algorithmic processor for algorithmically processing said sensor output in a first algorithmic manner, said first algorithmic processor generating a first output indicative of the possibility of the presence of an occupant in the vehicle;
    a second algorithmic processor for algorithmically processing said sensor output in a second algorithmic manner, said second algorithmic processor generating a second output indicative of the possibility of the presence of an occupant in the vehicle;
    wherein said first algorithmic manner is different than said second algorithmic manner; and
    a decider that processes said first and second outputs and determines whether the combination of said first and second outputs is indicative of an occupant in the vehicle.

2. The occupant detection system of claim 1, wherein said first algorithmic processor comprises an artificial neural network.

3. The occupant detection system of claim 2, wherein said second algorithmic processor comprises a Fast Fourier transform algorithm.

4. The occupant detection system of claim 1, wherein said second algorithmic processor comprises a Fast Fourier transform algorithm.

5. The occupant detection system of claim 1, wherein said first and second outputs comprise a decision characteristic and a confidence rating of said decision characteristic.

6. The occupant detection system of claim 1, wherein said occupant detection system is activated in response to a triggering of a vehicle alarm system and a remote activation device.

7. The occupant detection system of claim 1, wherein said occupant detection system is positioned within the vehicle.

8. The occupant detection system of claim 1, wherein said occupant detection system is operable to detect an occupant within an interior cabin of a vehicle.

9. The occupant detection system of claim 1, wherein said sensor senses a movement that is indicative of a biometric parameter of a living being located within the vehicle.

10. The occupant detection system of claim 9, wherein said sensor senses a movement that is indicative of a heartbeat of a living being located within the vehicle.

11. The occupant detection system of claim 1, wherein said first algorithmic processor determines if said sensor output is indicative of an occupant in the vehicle.

12. The occupant detection system of claim 11, wherein said second algorithmic processor determines if said sensor output is indicative of an occupant in the vehicle.

13. An occupant detection system for detecting an occupant within a vehicle, said occupant detection system comprising:
    a sensor for sensing movement within the vehicle, said sensor generating a sensor output;
    a first algorithmic processor for algorithmically processing said sensor output in a first algorithmic manner, said first algorithmic processor generating a first output indicative of the possibility of the presence of an occupant in the vehicle, said first algorithmic processor comprising an artificial neural network;
    a second algorithmic processor for algorithmically processing said sensor output in a second algorithmic manner, said second algorithmic processor generating a second output indicative of the possibility of the presence of an occupant in the vehicle;
    wherein said first algorithmic manner is different than said second algorithmic manner;
    wherein said first and second outputs comprise a decision characteristic and a confidence rating of said decision characteristic; and
    a decider that processes said first and second outputs and determines whether the combination of said first and second outputs is indicative of an occupant in the vehicle.

14. The occupant detection system of claim 13, wherein said occupant detection system is operable to detect an occupant within an interior cabin of a vehicle.

15. The occupant detection system of claim 13, wherein said sensor senses a movement that is indicative of a biometric parameter of a living being located within the vehicle.

16. The occupant detection system of claim 15, wherein said sensor senses a movement that is indicative of a heartbeat of a living being located within the vehicle.

17. The occupant detection system of claim 13, wherein said second algorithmic processor comprises a Fast Fourier transform algorithm.

18. An occupant detection system for detecting an occupant within a vehicle, said occupant detection system comprising:
    a sensor for sensing movement within an interior cabin of the vehicle, said sensor generating a sensor output;
    a first algorithmic processor for algorithmically processing said sensor output in a first algorithmic manner, said first algorithmic processor generating a first output indicative of the possibility of the presence of an occupant within the interior cabin of the vehicle;
    a second algorithmic processor for algorithmically processing said sensor output in a second algorithmic manner, said second algorithmic processor generating a second output indicative of the possibility of the presence of an occupant within the interior cabin of the vehicle;

wherein said first algorithmic manner is different than said second algorithmic manner;

a decider that processes said first and second outputs and determines whether the combination of said first and second outputs is indicative of an occupant in the vehicle; and wherein said occupant detection system is activated in response to a triggering of a vehicle alarm system and a remote activation device.

19. The occupant detection system of claim 18, wherein said occupant detection system is positioned within the vehicle.

20. The occupant detection system of claim 18, wherein said sensor senses a movement that is indicative of a biometric parameter of a living being located within the interior cabin of the vehicle.

21. The occupant detection system of claim 18, wherein said first algorithmic processor comprises an artificial neural network.

22. The occupant detection system of claim 18, wherein said second algorithmic processor comprises a Fast Fourier transform algorithm.

* * * * *

UNITED STATES PATENT AND TRADEMARK OFFICE
CERTIFICATE OF CORRECTION

PATENT NO.        : 8,258,932 B2                             Page 1 of 1
APPLICATION NO.   : 11/719476
DATED             : September 4, 2012
INVENTOR(S)       : Jonas Erik Ragnar Wahlstrom It is certified that error appears in the above-identified patent and that said Letters Patent is hereby corrected as shown below:

Column 6
Line 17, "rioting" should be --noting--

Signed and Sealed this
Twenty-seventh Day of November, 2012

David J. Kappos
*Director of the United States Patent and Trademark Office*